United States Patent [19]

Ericsson et al.

[11] Patent Number: 4,519,918

[45] Date of Patent: May 28, 1985

[54] PROCESS FOR THE ABSORPTION OF ORGANIC LIQUIDS BY USE OF A HYDROPHOBIC FIBROUS MATERIAL

[75] Inventors: Thomas Ericsson, Mölndal; Sten Gylfe, Krylbo; Mats-Olov Hedblom, Avesta, all of Sweden

[73] Assignee: Papyrus Kopparfors AB, Mölndal, Sweden

[21] Appl. No.: 460,412

[22] Filed: Jan. 24, 1983

[30] Foreign Application Priority Data

Jul. 27, 1981 [SE] Sweden ................................ 8104567
Jul. 24, 1982 [DE] Fed. Rep. of Germany ....... 3227949

[51] Int. Cl.$^3$ ............................................. B01D 15/00
[52] U.S. Cl. .................................... 210/680; 210/693; 210/924
[58] Field of Search ............ 210/671, 680, 693, 502.1, 210/505, 508, 924

[56] References Cited

U.S. PATENT DOCUMENTS

| | | | |
|---|---|---|---|
| 3,607,741 | 9/1971 | Sohnius | 210/680 |
| 3,770,575 | 11/1973 | Ball | 210/924 |
| 4,102,783 | 7/1978 | Zenno et al. | 210/693 |
| 4,371,441 | 2/1983 | Mathes et al. | 210/924 |

*Primary Examiner*—Ivars Cintins

[57] ABSTRACT

A process is provided for the absorption of organic liquids, particularly oil, using hydrophobic fibrous material prepared by impregnating fibrous material comprising cellulose fibers with a liquid resinous material selected from the group consisting of acrylate prepolymers and polymers, alkyd prepolymers and polymers, and polyester prepolymers and polymers in an amount to provide in the impregnated fibrous material from about 0.5 to about 30% by weight polyacrylate, polyalkyd or polyester, and then heating the impregnated fibrous material to convert the polymer or prepolymer by chemical reaction into a hydrophobic polymer rendering the fibrous material hydrophobic.

4 Claims, No Drawings

PROCESS FOR THE ABSORPTION OF ORGANIC LIQUIDS BY USE OF A HYDROPHOBIC FIBROUS MATERIAL

Various methods for the preparation of hydrophobic oil-absorbing materials are known. The recovery of surface oil discharges on water requires that the hydrophobic oil-absorbing material be in contact with the aqueous phase, sometimes for a long time, before being in contact with the oil phase. Despite the hydrophobic nature of the absorption material, its capability for absorption of oil is much reduced after contact with water, and therefore the hydrophobic oil-absorbing material in no way shows the unexpected oil-absorbing efficiency.

The present invention provides for the absorption of the oil by use of a hydrophobic fibrous material which retains its oil-absorbing efficiency even after having been in contact with water for a long time. The hydrophobic fibrous material is prepared by impregnating fibrous material comprising cellulose fibers with a liquid resinous material selected from the group consisting of acrylate prepolymers and polymers alkyd prepolymers and polymers and polyester prepolymers and polymers in an amount to provide in the impregnated fibrous material from about 0.5 to about 30% by weight polyacrylate, polyalkyd or polyester, and then heating the impregnated fibrous material to convert the polymer or prepolymer by chemical reaction into a hydrophobic polymer rendering the fibrous material hydrophobic.

The chemical reaction can be a further polymerization of the prepolymer or polymer. It can also be a cross-linking reaction using a cross-linking agent, introducing croos-links between polymer chains.

The invention is applicable to the absorption of organic liquids of all kinds, including not only petroleum oil but also gasoline, toluene, trichloroethylene and ethylene glycol, and also petroleum oil derivatives such as lubricating oil, hydraulic oil and metal working oil.

The fibrous material to be impregnated comprises hydrophilic cellulose fibers derived from any cellulose-containing naturally-occurring material, such as wood, cotton, straw, grass, bast, ramie, linen, bagasse, hemp, sisal, jute. Cellulose pulp fibers liberated from lignocellulosic material by any pulping process such as chemical cellulose fibers, mechanical lignocellulose fibers, chemimechanical fibers, semimechanical fibers, and reject fibers from pulp mills or paper board mills are particularly preferred. Peat fibers liberated from matured peat also can be used.

The fibers can be sized or unsized. Sized fibers may be naturally sized (e.g. raw cotton) or synthetically sized, in accordance with conventional sizing methods (e.g. by rosin sizing or neutral sizing). Cellulose pulp fibers (in particular reject fibers) may contain different kinds of additives commonly used in pulp mills, such as fillers, sizing agents, retention agents, starch, latex, etc. The cellulose fibers should comprise at least 60% up to 100% of the fibrous material.

The wet fibers can be impregnated before laydown as a mat by adding the liquid prepolymer to a mixing tank prior to the head box in a papermaking machine, or to the head box itself. The liquid prepolymer can also be added to the wire prior to the press section of the machine by spraying, or after the press section either onto the mat or paper on in the conveying screw (where the mat or paper is disintegrated) or in a mixer. Then the wet treated material is fed to a dryer.

The dry fibers can be impregnated by spraying with the liquid prepolymer in the dryer.

During the drying the impregnated fibers are then heated at a suitable temperature, below the temperature at which the fibrous material would be damaged, within the range from about 50° to about 200° C., preferably from about 75° to about 160° C., to effect any desired reaction.

The term "prepolymer" as used herein includes the monomer mixture and lower polymers of the monomers to be polymerized, i.e. dimers, trimers, etc.

The chemical reaction resulting in converting the cellulose fibers from hydrophilic to hydrophobic in nature can be a further polymerization or a graft polymerization or a copolymerization, and/or a cross-linking. There can accordingly be added with the polymer or prepolymer an additive participating in or effecting the chemical reaction, including polymerization initiators, catalysts, and accelerators; and cross-linking agents.

An alkyd polymer is a polyester of a polyhydric alcohol (glycol or higher polyol) and a polycarboxylic (dibasic or higher) carboxylic acid. Both alcohol and acid are usually aliphatic and the acid can be in the form of its anhydride. As a chain terminator in the esterification process there is used a monocarboxylic acid (usually a fatty acid) which greatly influences the properties of the polymer. The "prepolymer" is a partial polyester from these reactants.

Exemplary polyols include ethylene glycol, glycerol, pentaerythritol, trimethylolpropane, neopentyl glycol, and other glycols. Exemplary polycarboxylic acids include phthalic anhydride, isophthalic anhydride, adipic acid, sebacici acid, maleic acid, succinic acid, citric acid, etc. The monocarboxylic acid can be the fatty acid mixture derived from natural fats and oils, such as linseed oil, soybean oil, castor oil, wood oil, coconut oil, cottonseed oil, tung oil, and safflower seed oil, as well as tall oil fatty acids and benzoic acid or a substituted benzoic acid.

The average molecular weight ($\overline{M}$) is normally from 20,000 to 50,000.

An alkyd prepolymer or polyester prepolymer can be added with a cross-linking agent as an additive which in the presence of heat cross-links the alkyd prepolymer or the polyester prepolymer to form an alkyd or polyester resin.

For the cross-linking reaction there is used a resin, usually a urea-formaldehyde or melamine-formaldehyde resin, preferably etherified with butanol. The cross-linking reaction occurs at temperatures within the range of from 100° to 130° C. However, the reaction is catalyzed by an inorganic acid, e.g. phosphoric acid, or an organic acid, e.g. salicylic acid. When using an acid catalyst the cross-linking reaction occurs at temperatures within the range of from 80° to 90° C.

The lacquer solution of alkyd prepolymer used in Examples 6, 8 and 9 is based on pentaerythritol and glycerol as the polyol, phthalic acid as the polyvalent carboxylic acid, coconut fatty acid and castor oil as terminators, melamine-formaldehyde resin as cross-linking agent, and phosphoric acid as catalyst.

Polyester resins do not contain any oil component, but are otherwise similar to alkyd resins and are, in other words, oil-free-alkyds.

The lacquer solution of polyester prepolymer used in Examples 7, 10 and 11 is based on neopentyl glycol and trimethylolpropane as the polyol, isophthalic acid and adipic acid as the polycarboxylic acid, benzoic acid and p-tert-butylbenzoic acid as terminators, melamine-formaldehyde resin as cross-linking agent, and phosphoric acid as catalyst.

Acrylate resins are derived from acrylic acid or acrylic acid esters, such as polyacrylic acid, polymethylmethacrylate, and polyethylmethacrylate. As cross-linking agents melamine-formaldehyde resin or urea-formaldehyde resin or derivatives thereof can be used. The cross-linking reaction can be catalyzed by an acid.

The lacquer solution of an acrylate prepolymer used in Examples 1 to 5 is based on hydroxyalkylmethacrylate as polymer, melamine-formaldehyde resin as cross-linking agent and phosphoric acid as catalyst. The average molecular weight ($\overline{M}$) is in the range of about 20,000 to about 50,000.

Thus, it is possible to polymerize the acrylate prepolymer in the heating step by means of free radicals, and in that case a free-radical initiator must be present. One can also cross-link the acrylate prepolymer, which in that case contain hydroxyl groups, for example, hydroxy ethyl ether groups, using a conventional cross-linking agent, such as of melamine type, in which case an acidic catalyst is used.

A great advantage of the process is that it is possible to render the impregnated fibrous material sufficiently hydrophobic, even when contacted with water for a long time, by heat treatment at moderate temperatures, since the polymer can be finally polymerized or cured at a relatively low temperature by the proper choice of additive.

The hydrophobic fibrous material normally is used in granulated or shredded form. The fibrous material can be granulated or shredded after preparation using conventional granulating or shredding apparatus. The resulting fibers can be assembled as a mass on water with the aid of a floating boom or other means, and guided towards the floating liquid to be absorbed.

The following Examples represent preferred embodiments of the invention exemplified below. In these Examples, the hydrophobicity and effectiveness of the fibrous material in the process of the invention is evaluated using the following standardized test procedure.

5 g of the fibrous material to be tested is weighed and is then transferred to a 1 liter beaker containing 400 ml of water. Then the mixture of water and fibrous material is stirred for 5 minutes by means of a magnetic stirrer at 500 rpm.

The mixture is allowed to stand for 5 minutes and is then poured through a screen. The fibrous material collected on the screen is allowed to drain for 5 minutes, i.e., the fibrous material is not squeezed. The water retained in the meshes of the screen is absorbed with ordinary paper towelling.

Then the moist fibrous material retained on the screen is weighed, and the weight obtained minus the conditioned dry weight (5 g) of the fibrous material is called "water weight" in the Examples below.

The weighed moist fibrous material is then transferred to a beaker containing SAE 20 lubricating oil, and is slurried in the oil with a spoon. The mixture of oil and fibrous material is allowed to stand for 5 minutes, and then the mixture is screened. The fibrous material retained on the screen is allowed to drain for 5 minutes, i.e. the fibrous material is not squeezed. The oil retained in the meshes of the screen is absorbed with ordinary paper towelling and then the oil-containing fibrous material is weighed. The weight obtained minus the water weight and the dry weight of the fibrous material is called "oil weight", in the Examples below.

The "oil ratio" is the ratio of oil weight to dry weight (5 g).

EXAMPLE 1

Mechanical cellulose pulp fibers sized with a conventional rosin size (Hercules T size) were treated by impregnation with 2% by weight, calculated on the weight of the cellulose fibers, of a commercially available lacquer solution of an acrylate prepolymer from BASF (Einbrennlack FF 76-0016) containing 43% of active substance including curing additives, 30% xylene, 14% alcohol and 13% glycol, to which was added 3% by weight (calculated on the lacquer solution) of acid curing agent from BASF (Säurehärter SC 10-9111). Then the fibrous material was dried at 85° C.

The resulting hydrophobic fibrous material was tested by the procedure described above, with the following results:
Water weight: 10.9 g
Oil weight: 24.9 g
Oil ratio: 5.0

The fibers were granulated or shredded and used successfully to remove a surface layer of oil floating on water.

EXAMPLE 2

The procedure of Example 1 was repeated, but with the difference that the rosin-sized cellulose fibers were impregnated with 5% by weight of the acrylate prepolymer solution of Example 1. The resulting hydrophobic fibrous material in the test procedure described above gave the following results:
Water weight: 7.3 g
Oil weight: 28.4 g
Oil ratio: 5.7

The fibers were granulated or shredded and used successfully to remove a surface layer of oil floating on water.

COMPARATIVE EXAMPLE A

As a control, Example 1 was repeated, but the fibers were not treated with acrylate prepolymer solution. The following results were obtained, using the test method described above:
Water weight: 16.8 g
Oil weight: 11.0 g
Oil ratio: 2.2

It is apparent that the control absorbed far more water, and correspondingly far less oil.

COMPARATIVE EXAMPLE B

The rosin-sized cellulose fibers used in Example 1 were mixed with 2% by weight of 50% polyethylene fibers (HOSTAPULP EC 5300 from HOECHST) instead of with acrylate prepolymer. The fibrous material was heated at 150° C. for 30 minutes, whereupon the polyethylene fiber melted.

The following results were obtained, using the test method described above:
Water weight: 21.0 g
Oil weight: 21.5 g
Oil ratio: 4.3

It is apparent that the control absorbed far more water, and correspondingly far less oil.

The fibers could not be used to remove a surface layer of oil on water, because they absorbed water and sank too quickly.

COMPARATIVE EXAMPLE C

Comparative Example B was repeated but using 5% by weight of HOSTAPULP EC 5300.

The following results were obtained, using the test method described above:
Water weight: 19.1 g
Oil weight: 22.1 g
Oil ratio: 4.4

It is apparent that the control absorbed far more water, and correspondingly far less oil.

The fibers could not be used to remove a surface layer of oil on water because they absorbed water and sank too quickly.

EXAMPLE 3

Reject cellulose pulp fibers from a board mill were treated by impregnation with 5% by weight of the lacquer solution of acrylate prepolymer used in Example 1. Drying was effected at 85° C.

The following results were obtained, using the test method described above:
Water weight: 4.0 g
Oil weight: 8.1 g
Oil ratio: 1.6

The fibers were granulated or shredded and used successfully to remove a surface layer of oil floating on water.

COMPARATIVE EXAMPLE D

As a control, Example 3 was repeated, but the reject fibers were not treated with any acrylate solution. The following results were obtained:
Water weight: 11.1 g
Oil weight: 2.9 g
Oil ratio: 0.6

It is apparent that the control absorbed far more water, and correspondingly far less oil.

The fibers could not be used to remove a surface layer of oil on water, because they absorbed water and sank too quickly.

EXAMPLE 4

Nonsized and ungranulated mechanical cellulose pulp fibers were treated by impregnation with 5% by weight of the acrylate prepolymer solution used in Example 1. Drying was effected at 85° C.

The hydrophobic fibrous material obtained could not be tested by the above-mentioned test method, since a pure fiber suspension was obtained when treating with water. The test method was modified as follows:

The test method is the same up to and including the weighting of the water-treated screened fibrous material. Then, the weighed aqueous fibrous material is soaked in a weighed amount of oil by slurrying the fibrous material in a beaker with a spoon. The mixture of fibrous material and oil is allowed to stand for 5 minutes. Then the mixture is screened as in the above test method. When screening the fibrous material there is obtained as screening liquid a mixture of non-absorbed oil and displaced water. The amounts of said two substances are determined, and then the amount of oil absorbed by the fibrous material is calculated.

In this modified test method, the following results were obtained:
Water weight: 40.4 g (When absorbing oil the fibrous material lost 23.1 g of water, giving 17.3 g as residue)
Oil weight: 40.7 g
Oil ratio: 8.1

The fibers were granulated or shredded and used successfully to remove a surface layer of oil floating on water.

COMPARATIVE EXAMPLE E

As a control, Example 4 was repeated, but the fibers were not treated with acrylate prepolymer solution. The following results were obtained, using the modified test method in Example 4:
Water weight: 54.6 g (The amount of water displaced when absorbing oil=4.0 g)
Oil weight: 6.5 g
Oil ratio: 1.3

It is apparent that the control absorbed far more water, and correspondingly far less oil.

The fibers could not be used to remove a surface layer of oil on water, because they absorbed water and sank too quickly.

COMPARATIVE EXAMPLE F

Example 4 was repeated but instead of acrylate prepolymer solution the fibers were mixed with 5% by weight of the 50% polyethylene fibers (HOSTAPULP EC 5300) used in comparative Example B above. The impregnated fibrous material was heated at 150° C. for 30 minutes, whereupon the polyethylene fibers melted.

The modified test method in Example 4 gave the following results:
Water weight: 64.0 g (The amount of water displaced when absorbing oil=1.3 g)
Oil weight: 4.5 g
Oil ratio: 0.9

It is apparent that the control absorbed far more water, and correspondingly far less oil.

The fibers could not be used to remove a surface layer of oil on water, because they absorbed water and sank too quickly.

EXAMPLE 5

Fibrous peat was treated by impregnation with 5% by weight of the acrylate prepolymer solution of Example 1. Drying was effected at 85° C.

The hydrophobic fibrous peat material was tested by the modified test method in Example 4, with the following results:
Water weight: 40.2 g (The amount of water displaced when absorbing oil=21.9 g)
Oil weight: 34.7 g
Oil ratio: 6.9

The fibers were granulated or shredded and used successfully to remove a surface layer of oil floating on water.

COMPARATIVE EXAMPLE G

As a control, peat not treated as in Example 5 was tested with the following results:
Water weight: 44.9 g (The amount of water displaced when absorbing oil=5.5 g)
Oil weight: 10.5 g
Oil ratio: 2.1

It is apparent that the control absorbed far more water, and correspondingly far less oil.

The fibers could not be used to remove a surface layer of oil on water, because they absorbed water and sank too quickly.

EXAMPLE 6

Reject cellulose pulp fibers from a board mill were treated with 5% by weight of a lacquer solution of alkyd prepolymer. Drying was effected at 85° C. The hydrophobic fibrous material gave the following results by the above test method:
Water weight: 15.1 g
Oil weight: 9.1 g
Oil ratio: 1.8

The fibers were granulated or shredded and used successfully to remove a surface layer of oil floating on water.

EXAMPLE 7

The reject cellulose pulp fibers in accorance with Example 6 were treated with 5% of a lacquer solution of prepolymer ester. Upon drying at 85° C., the hydrophobic fibrous material gave the following results:
Water weight: 4.2 g
Oil weight: 9.2 g
Oil ratio: 1.8

The fibers were granulated or shredded and used successfully to remove a surface layer of oil floating on water.

EXAMPLE 8

Mechanical cellulose pulp fibers sized with a conventional rosin size (Hercules T size) (cf. Example 1) was treated by impregnation with 2% by weight of alkyd prepolymer. Upon dryng at 85° C., the hydrophobic fibrous material gave the following results:
Water weight: 11.5 g
Oil weight: 23.2 g
Oil ratio: 4.6

The fibers were granulated or shredded and used successfully to remove a surface layer of oil floating on water.

EXAMPLE 9

Example 8 was repeated, but with the fibers treated wtih 5% by weight of alkyd prepolymer instead of 2%. Upon drying at 85° C. the hydrophobic fibrous material gave the following test results:
Water weight: 8.7 g
Oil weight: 26.3 g
Oil ratio: 5.1

The fibers were granulated or shredded and used successfully to remove a surface layer of oil floating on water.

EXAMPLE 10

Mechanical cellulose pulp fibers sized with conventional rosin size (Hercules T size) (cf. Example 1) were treated with 2% by weight of polyester prepolymer. Upon drying at 85° C., the hydrophobic fibrous material gave the following results:
Water weight: 11.1 g
Oil weight: 24.0 g
Oil ratio: 4.9

The fibers were granulated or shredded and used successfully to remove a surface layer of oil floating on water.

EXAMPLE 11

Example 10 was repeated, but with the cellulose fibers treated with 5% by weight of polyester prepolymer instead of 2%. Upon drying at 85° C. the hydrophobic fibrous material gave the following results:
Water weight: 8.5 g
Oil weight: 27.0 g
Oil ratio: 5.4

The fibers were granulated or shredded and used successfully to remove a surface layer of oil floating on water.

Having regard to the foregoing disclosure, the following is claimed as the patentable and inventive embodiments thereof:

1. A process for the absorption of surface layers of water-insoluble organic liquids floating on water which comprises contacting the surface layer with hydrophobic fibrous material prepared by impregnating cellulose pulp fibers with a liquid resinous material selected from the group consisting of acrylate prepolymers, alkyd prepolymers, and polyester prepolymers in an amount to provide in the impregnated fibrous material from about 0.5 to about 30% by weight polyacrylate, polyalkyd or polyester, and then hating the impregnated cellulose pulp fibers to convert the prepolymer by chemical reaction into a hydrophobic polymer rendering the cellulose pulp fibers hydrophobic.

2. A process according to claim 1 in which the chemical reaction is a further polymerization of the prepolymer.

3. A process according to claim 1 in which the chemical reaction is a cross-linking reaction using a cross-linking agent introducing cross-links between polymer chains.

4. A process according to claim 1 in which the impregnated cellulose pulp fibers comprises hydrophilic cellulose pulp fibers derived from cellulose-containing naturally-occurring material.

* * * * *